(12) United States Patent
Mehta et al.

(10) Patent No.: US 6,416,911 B1
(45) Date of Patent: Jul. 9, 2002

(54) IMAGE BONDING TREATMENT OF RETROREFLECTIVE SURFACES

(75) Inventors: Rajendra Mehta; A. Dale Lakes, both of Dayton; Richard Lynn Shields, Centerville, all of OH (US)

(73) Assignee: The Standard Register Company, Dayton, OH (US)

( * ) Notice: Subject to any disclaimer, the term of this patent is extended or adjusted under 35 U.S.C. 154(b) by 0 days.

(21) Appl. No.: 10/010,489

(22) Filed: Nov. 13, 2001

Related U.S. Application Data

(62) Division of application No. 09/309,454, filed on May 11, 1999.

(51) Int. Cl.$^7$ ................................................ G03C 3/00
(52) U.S. Cl. ........................ 430/11; 430/18; 430/126; 427/163.4; 427/372.2; 428/325
(58) Field of Search .................. 430/11, 18, 126; 427/163.4, 372.2; 428/325

(56) References Cited

U.S. PATENT DOCUMENTS

| | | |
|---|---|---|
| 2,835,324 A | 10/1958 | Van Dorn |
| 3,130,064 A | 4/1964 | Insalaco |
| 3,540,978 A * | 11/1970 | Ames ........................ 428/325 |
| 4,071,362 A | 1/1978 | Takenaka et al. |
| 4,181,766 A | 1/1980 | Williams et al. |
| 4,268,117 A | 5/1981 | Sevelin |
| 4,505,967 A * | 3/1985 | Bailey ........................ 428/164 |
| 4,510,225 A | 4/1985 | Kuehnle et al. |
| 4,520,053 A | 5/1985 | Marentic |
| 4,530,859 A | 7/1985 | Grunzinger, Jr. |
| 4,547,668 A | 10/1985 | Tsikos |
| 4,663,213 A | 5/1987 | Bailey et al. |
| 4,664,966 A | 5/1987 | Bailey et al. |
| 4,755,425 A | 7/1988 | Huang |
| 4,767,659 A | 8/1988 | Bailey et al. |
| 4,808,471 A | 2/1989 | Grunzinger |
| 4,844,976 A | 7/1989 | Huang |
| 4,863,783 A | 9/1989 | Milton |
| 4,896,943 A | 1/1990 | Tolliver et al. |
| 4,950,525 A | 8/1990 | Bailey |
| 4,968,063 A | 11/1990 | McConville et al. |
| 5,045,426 A | 9/1991 | Maierson et al. |
| 5,073,404 A | 12/1991 | Huang |
| 5,102,737 A | 4/1992 | Josephy et al. |
| 5,107,416 A | 4/1992 | Jippo et al. |
| 5,118,930 A | 6/1992 | Takada |
| 5,219,641 A | 6/1993 | Mehta et al. |
| 5,256,721 A | 10/1993 | Wilson et al. |
| 5,378,575 A * | 1/1995 | Rajan et al. ................. 430/126 |
| 5,514,441 A | 5/1996 | Pohto et al. |
| 5,672,381 A | 9/1997 | Rajan |
| 5,698,296 A | 12/1997 | Dotson et al. |
| 5,804,301 A * | 9/1998 | Curatolo ..................... 428/352 |
| 5,900,978 A | 5/1999 | Sagar et al. |
| 6,073,968 A | 6/2000 | Casper |

FOREIGN PATENT DOCUMENTS

| | | |
|---|---|---|
| EP | A-0615788 | 9/1994 |
| WO | WO 94/19710 | 9/1994 |
| WO | WO 96/24493 | 8/1996 |
| WO | WO 98/04419 | 2/1998 |

* cited by examiner

*Primary Examiner*—Mark Chapman
(74) *Attorney, Agent, or Firm*—Killworth, Gottman, Hagan & Schaeff, L.L.P.

(57) ABSTRACT

A coating for a retroreflective document is provided which renders the surface of the document receptive to toners and inks printed thereon while not substantially interfering with the retroreflective properties of the underlying substrate. Methods for fabricating the document are also provided.

11 Claims, 1 Drawing Sheet

IMAGE BONDING TREATMENT OF RETROREFLECTIVE SURFACES

CROSS REFERENCE TO RELATED APPLICATIONS

This application is a division of U.S. patent application Ser. No. 09/309,454, filed May 11, 1999 allowed.

BACKGROUND OF THE INVENTION

The present invention relates to documents having retroreflective properties, and more particularly to documents such as labels, designs, and decals which have a retroreflective surface which is receptive to printed indicia.

Retroreflective surfaces are used in a variety of applications where a strong reflective return of directed light is desired. Such applications include labels, designs, decals, barrier markers, and the like. These surfaces are typically comprised of a substrate which has coated on at least one surface thereof a layer of glass microspheres which are adhered to the substrate with an adhesive or binder. Each glass microsphere acts as a reflecting lens, returning incident light which impinges thereupon within a narrow angle cone. When light is directed toward such a surface at an angle of approximately 90°, its is strongly reflected back in the direction of the light source and appears to a viewer as a strong and independent light source emanating from the surface.

This retroreflective technology has been developed and adapted for many uses, and commercial retroreflective products are available from numerous sources including 3M Corp. under the trademark Scotchlite®, Reflexlite North America, and Printmark Industries. A number of retroreflective products use three-dimensional microprisms which are embossed into the surface of a transparent film substrate instead of bonding microspheres to the surface.

Documents such as labels and decals have a variety of uses including imparting information about a product to a user thereof. In many instances, an adhesive is used to secure the labels or decal to an underlying surface. Where the document is used in an outdoor environment, it is important that the document, and any printed information thereon, is resistant to sunlight, moisture, abrasion, and other environmental factors.

Also, in many applications, information is printed onto a label or decal surface prior to use. The information may be repetitive. That is, the information which is printed may be the same (repetitive) for a series of labels. Typically, such repetitive information is provided by conventional printing processes such as flexography, gravure, letterpress, lithography, and screen printing. Additionally, at least a portion of the information which is printed may be non-repetitive. That is, the information which is printed is unique to each individual label. Typically, non-repetitive information is provided using impact printers such as dot matrix printers, or non-impact printers such as laser, thermal transfer, or ink jet imaging, all under computer control.

An example of repetitive information printed on a label would be generic information concerning the manufacturer of the label, the name of the product, etc. An example of non-repetitive information would be a unique serial or product number or bar code which was unique to an individual label.

One common use for such labels are annual renewal stickers for automobile and truck license plates. These labels have a generic or repetitive portion common to all of the labels which typically includes the name of the state and the year and/or month of expiration. The labels also include an identification number or series of letters and numbers which is specific to the vehicle. Such unique identification numbers are typically applied by a dot matrix, laser, thermal transfer, or ink jet printer. All of the images and information on such labels, including the unique vehicle identification numbers, must be able to withstand exposure to the environment (weather, light, abrasion, solvents and cleaners, etc.) for at least one year.

There has been a problem for such vehicle labels in that the laser or ink jet printed non-repetitive information, and even the conventionally applied repetitive information, does not adhere well to the surface of typical retroreflective substrates. Generally, glass microspheres are bonded to the substrate by a polymeric binder and protrude from the binder by approximately one-half of the diameter of the spheres. In many instances, a polymeric top coat will be applied over the binder and microspheres. The polymeric binder and/or top coat may be any of a number of known resins including alkyds, polyurethanes, polyamides, polyesters, and the like. Such binders are typically chosen for their ability to bond the microspheres to the substrate, not for their ability to receive inks or toners. And, the top coat polymers are typically chosen for optical transparency, not for their ability to receive inks and toners. Thus, the inks or toners which are applied to the retroreflective surface of the substrate tend to flake or prematurely peel away.

One attempted solution to this problem has been to apply coatings having enhanced toner adhesion properties over the retroreflective surface. To such coatings, the ink or toner is applied. However, heretofore such coatings have been at least somewhat opaque due to the presence of various fillers and/or pigments, and have interfered, at least to some degree, with the retroreflective surface properties of the label making the label less reflective.

While other adhesion enhancing coatings are known, they are typically coated onto cellulosic substrates which have very different surface properties than retroreflective surfaces. Examples of prior art adhesion enhancing coatings include U.S. Pat. Nos. 5,045,426, 4,510,225, 2,855,324, 3,130,064, 4,863,783, 4,071,362, 5,017,416, 5,219,641, and 5,698,296. However, such prior art coatings suffer from a number of drawbacks including excessive crosslinking of the polymers, lack of optical transparency, incompatibility with polymeric substrates, and an inability to apply such coatings using conventional printing techniques.

Accordingly, there remains a need in this art for a coating which can be readily applied over a retroreflective surface by printing techniques and which enhances the adhesion of toners and inks printed thereon while not substantially interfering with the retroreflective properties of the underlying substrate. Preferably, the coating would also provide resistance to degradation of the printed indicia from environmental sources including solvents, physical abrasion, detergents, water, and sun light.

SUMMARY OF THE INVENTION

The present invention meets those needs by providing a coating for a retroreflective document which renders the surface of the document receptive to toners and inks printed thereon while not substantially interfering with the retroreflective properties of the underlying substrate. That is, a coating of the present invention will not substantially reduce the retroreflective properties of the document. The term "receptive" as used herein refers to the ability of the coating to provide a surface to which inks and toners adhere or bond well to, thereby improving the quality and durability of the printed indicia. By "not substantially reduce," it is meant that the retroreflectivity of the substrate remains at least about 60%, and preferably at least about 75%, of its original value. The coating also provides resistance to degradation of the printed indicia from environmental sources including solvents, physical abrasion, detergents, water, and sun light, including those indicia which may be pre-printed on the retroreflective surface prior to the application of the coating of the present invention.

In accordance with one aspect of the present invention, a retroreflective document having a transparent ink and toner receptive coating thereon is provided. The coating consists essentially of a crosslinked acrylic acid resin which is optically transparent and does not substantially interfere with the retroreflective properties of the underlying sheet, which increase adhesion or bonding of toners and inks to the retroreflective sheet, and which is resistant to environmental attack. In one embodiment, the crosslinked acrylic acid resin is applied as an aqueous dispersion or emulsion consisting essentially of from about 50 to about 70 wt % acrylic acid resin, from about 2 to about 5 wt % of a crosslinking agent, optionally from about 0 to about 2 wt % of a surfactant, and the balance water.

In another embodiment, the toner and ink receptive coating is applied as a 100% solids (i.e., solvent-free) liquid consisting essentially of from about 50 to about 98 wt % of an acrylic acid ester monomer or oligomer having ethylenic unsaturation in its backbone, from about 2 to about 8 wt % of a photocatalyst, and from about 0.5 to about 2 wt % of a surfactant.

The present invention also provides a process for making a printable retroreflective document which includes the steps of providing a retroreflective substrate, printing a liquid, transparent toner and ink receptive coating consisting essentially of a crosslinkable acrylic acid resin and a crosslinking agent onto the substrate, and curing and crosslinking the toner and ink receptive coating. The retroreflective substrate may include a monolayer of microspheres bonded to the substrate or, alternatively, may include embossed or adhered microprisms on the substrate. The process may also include the step of printing indicia onto the surface of the toner and ink receptive coating. This printing step may use conventional inks, ink jet inks, thermal transfer inks, impact ribbon inks, or the printing step may use toner applied from a laser or other non-impact printing device.

In an alternative embodiment of the invention, a process for making a printable retroreflective document is provided and includes the steps of providing a reflective substrate, mixing microspheres with a liquid, transparent toner and ink receptive coating consisting essentially of a crosslinkable acrylic acid resin and a crosslinking agent onto the monolayer of microspheres to form a slurry, applying the slurry to the surface of the reflective substrate, and curing and crosslinking the toner and ink receptive coating. In yet another alternative embodiment, a process for making a printable retroreflective document is provided and includes the steps of providing a reflective substrate, applying a liquid, transparent toner and ink receptive coating consisting essentially of a crosslinkable acrylic acid resin and a crosslinking agent onto the reflective substrate, applying and embedding a monolayer of microspheres in the toner and ink receptive coating, and curing and crosslinking the coating.

Accordingly, it is a feature of the invention to provide a coated retroreflective document which is receptive to toners and inks printed thereon while not substantially interfering with the retroreflective properties of the underlying substrate. The coating also provides resistance to degradation of the printed indicia from environmental sources including solvents, physical abrasion, detergents, water, and sun light. These, and other features and advantages of the present invention, will become apparent from the following detailed description, the accompanying drawings, and the appended claims.

DETAILED DESCRIPTION OF THE PREFERRED EMBODIMENTS

Figure 1:
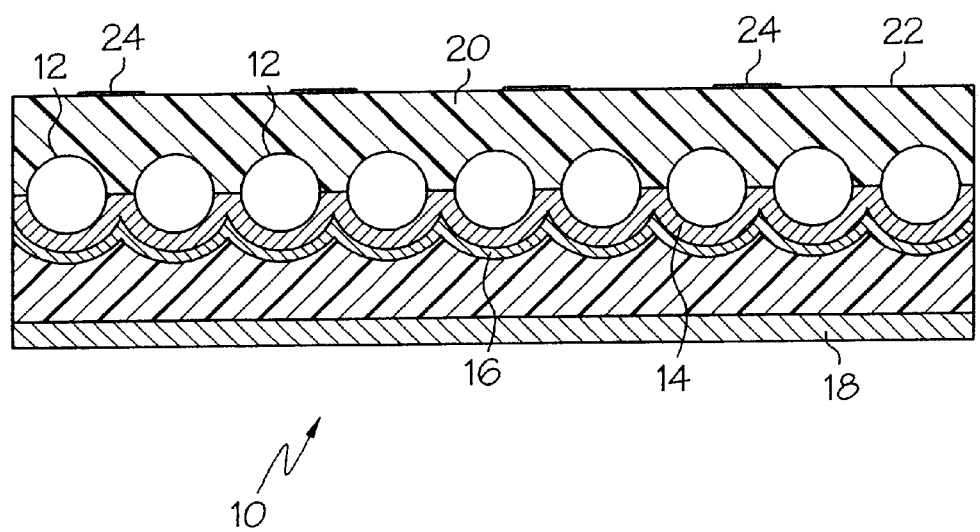
FIG. 1 is a side view, in section, illustrating the toner and ink receptive enhancing coating of the present invention on a retroreflective document.

The ink and toner receptive cross-linked coatings of the present invention provide not only enhanced adhesion and bonding of the toners and inks to the surface of the retroreflective documents, but also provide resistance to environmental attack from solvents, abrasion, detergents, water, and the like. In one preferred embodiment, the coating comprises an aqueous based dispersion or emulsion of a crosslinkable acrylic acid resin. A typical formulation for such a coating comprises from about 50 to about 70 wt % of acrylic acid resin such as, for example, Carboset (trademark) 2136, available from B. F. Goodrich, from about 2 to about 5 wt % of a crosslinking agent, and the balance water. Suitable crosslinking agents include, for example, zinc oxide, diethanolamine, and diethylenetriamine. The formulation optionally may contain from about 0 to about 2 wt % of a surfactant such as, for example, SWS 213 (commercially available from Wacker Silicones Corp., Adrian, Mich.). The optional surfactant may be useful in providing a pin-hole free coating and also acts to modify (increase) the surface tension of the formulation.

The presence of a crosslinking agent is important for ink reception and toner adhesion enhancement (i.e., improves the bond between the ink or toner and substrate) as well as for the solvent resistance of the coating. Preferably, the acrylic acid resin is substantially free of styrene as styrene can harden the resin, making it less receptive to inks and toners. In this embodiment of the invention, the coating is preferably cured by the application of heat to dry and crosslink the acrylate resin. The final coating is transparent at least to visible light and does not interfere with the retroreflective properties of the document.

In another embodiment of the invention, the coating comprises from about 50 to about 98 wt % of an acrylic acid ester monomer or oligomer having ethylenic saturation in its backbone, from about 2 to about 8 wt % of a photocatalyst, and from about 0.5 to about 2 wt % of a surfactant. Examples of suitable acrylic acid ester monomers and oligomers include tripropylene glycol diacrylate, tripropylene glycol triacrylate, and hexanediol diacrylate. A suitable photocatalyst is Irgacure (trademark) 651 (commercially available from Ciba Geigy Corp.). An example of a suitable surfactant is a fluorocarbon-based composition sold as FC-430 (commercially available from 3M Corp.). The surfactant acts as a flow aid and leveling agent for the formulation.

Typical formulations for this embodiment of the invention include, but are not limited to:

| Formulation 1 | |
|---|---|
| Rubber-modified acrylic | 58.96 wt % |
| 1,6 hexanediol acrylate | 23.58 |
| tripropylene glycol diacrylate | 11.79 |
| photocatalyst | 4.70 |
| surfactant | 0.94 |
| Formulation 2 | |
| polyester acrylate | 49.43 wt % |
| 1,6 hexanediol acrylate | 14.10 |
| trimethylol tripropylene triacrylate | 28.24 |
| photocatalyst | 7.56 |
| surfactant | 1.12 |
| Formulation 3 | |
| tripropylene glycol diacrylate | 14.80 wt % |
| aromatic hydrocarbon resin | 12.60 |
| epoxy diacrylate | 26.60 |
| urethane acrylate | 9.60 |
| rubber modified acrylate | 3.20 |
| triacrylate | 25.50 |
| photocatalyst | 7.20 |
| surfactant | 0.50 |

Preferably, the acrylate monomers and oligomers having ethylenic unsaturation in their backbones also include one or more of the following functional groups: halogen, carboxylic acid, chlorinated rubber, or other polar functional group. It has been determined that such functional groups enhance the bonding and adhesion of the inks and toners to the coating.

In this embodiment of the invention, the coating is preferably cured by exposure to ultraviolet radiation at wavelengths of from about 200 to about 400 nm. Alternatively, the coating may be cured by exposure to an electron beam.

The coatings of the present invention may be applied using conventional printing techniques such as flexographic printing. A specific example of such a printing technique is the application of the coating at a rotary flexographic flood coating station of a conventional web fed, pressure-sensitive label converting press. Alternatively, the coatings may be applied by gravure, screen printing, flood coating, anilox roll, or Meyer rod coating techniques or may be pattern coated or printed onto the retroreflective substrate. The coatings may be applied in-line with other press printing and substrate converting procedures in the production of retroreflective documents such as labels, tags, and signs. In this manner, some of the printed indicia on the documents may be printed prior to the application of the coating to provide increased protection from environmental attack.

In another embodiment, the coatings may be applied as the final step in the manufacture of the retroreflective web or sheet material. Manufacturing techniques for retroreflective materials are well known and described, for example, in U.S. Pat. Nos. 4,268,117, 4,664,966, and 4,808,471. A typical construction for the retroreflective document of the present invention is shown in FIG. 1. There, retroreflective document 10 has a monolayer of glass microspheres 12 partially embedded in a binder layer 14. Beneath glass microspheres 12 is a specularly reflective layer 16 such as vapor deposited aluminum and a pressure sensitive adhesive layer 18. A release liner (not shown) may be positioned over pressure sensitive adhesive layer 18 to protect the adhesive until the document is positioned for use. A layer 20 of a coating of the present invention overlies glass microspheres 12 and presents an ink and toner receptive surface 22. Printed indicia 24 is provided on surface 22. Such indicia may be printed as previously described using inks and/or toners.

In yet another embodiment of the invention, the coatings may be applied as a part of the manufacture of the retroreflective webs or sheets. For example, the liquid coating composition may be mixed with the glass microspheres used to produce the retroreflective characteristics of the substrate to form a slurry. Such a slurry is then applied to a reflective film carrier which has been previously fabricated with a film of a specularly reflective material such as aluminum. The applied slurry is then cured and crosslinked to provide a toner and ink receptive printable surface. Alternatively, the liquid coating may be applied to the reflective film carrier first, and the microspheres may then be spread onto the coating and embedded therein. The coating may then be cured.

In order that the invention may be more readily understood, reference is made to the following examples, which are intended to be illustrative of the invention, but are not intended to be limiting in scope.

EXAMPLE 1

Comparative tests were performed both on a prior art coating as well as coatings of the present invention applied to a retroreflective surface to determine each coating's effect on retroreflective properties, toner bonding, and environmental resistance of the coating to various solvents. In these tests, the coatings were applied using conventional flexographic printing techniques using a 600 line anilox roll. The results are reported in Table 1 below.

TABLE 1

| | Retroreflective Substrate[1] | Prior Art Coating[2] | Coating A[3] | Coating B[4] |
|---|---|---|---|---|
| Retroreflectivity[5] | 19.9 | 8.63 | 12.6 | 16.6 |
| Toner bonding[6] | very poor | excellent | excellent | excellent |
| Environmental Resistance[7] | | | | |
| a) mineral spirits | 0 | 20 | 2 | 20 |
| b) isopropanol | 0 | 20 | 0 | 30 |
| c) turpentine | 0 | 20 | 0 | 25 |
| d) Fantastik ® | 2 | 20 | 5 | 20 |
| e) naphtha | 0 | 20 | 0 | 30 |

[1]The substrate was 3M Scotchlite (trademark) 5460 brand retroreflective sheeting with alkyd resin top coat.
[2]A blend of acrylate resins with 30 wt % white pigment.
[3]Carboset GA 2136 (trademark) acrylic acid resin from B. F. Goodrich and zinc oxide crosslinking agent.
[4]Formulation No. 3, above.
[5]Measured using ASTM E-810-94, Standard Test Method for Coefficient of Retroreflection of Retroreflective Sheeting.
[6]Adhesive tape test as described in U.S. Pat. No. 5,698,296; toner (Standard Register standard non-MICR) printed using a Standard Register Model 5412 laser printer; very poor = greater than 50% toner removal; fair = less than 30% toner removal; good = less than 20% toner removal; excellent = less than 10% toner removal.
[7]Reported as number of "rubs" before substantial toner was removed "0" indicates immediate toner removal. Rub test was performed using cotton-tipped applicator dipped in solvent, applicator held between forefinger and thumb and then rubbed lightly over toner image in both directions using only very light pressure.

As can be seen, while a prior art coating was effective in enhancing toner adhesion to the retroreflective surface, the retroreflectivity of the substrate was significantly reduced to less than 45% of its original value. By comparison, coatings A and B of the present invention provided excellent toner adhesion enhancement while not substantially reducing the retroreflectivity of the surface.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A process for making a printable retroreflective document comprising the steps of providing a retroreflective substrate including a monolayer of microspheres bonded to a substrate, printing a liquid, transparent toner and ink receptive coating consisting essentially of a crosslinkable acrylic acid resin and a crosslinking agent onto said monolayer of microspheres, and curing and crosslinking said coating.

2. A process as claimed in claim 1 wherein said toner and ink receptive coating is an aqueous dispersion consisting essentially of from about 50 to about 70 wt % acrylic acid resin, from about 2 to about 5 wt % of a crosslinking agent, from about 1 to about 2 wt % of a surfactant, and the balance water.

3. A process as claimed in claim 2 wherein said coating is cured by applying heat to dry and crosslink said coating.

4. A process as claimed in claim 1 wherein said coating is a liquid consisting essentially of from about 50 to about 98 wt % of an acrylic acid ester monomer or oligomer having ethylenic unsaturation in its backbone, from about 2 to about 8 wt % of a photocatalyst, and from about 0.5 to about 2 wt % of a surfactant.

5. A process as claimed in claim 4 wherein said coating is cured by exposing it to radiation.

6. A process for making a printable retroreflective document comprising the steps of providing a reflective substrate, mixing microspheres with a liquid, transparent toner and ink receptive coating consisting essentially of a crosslinkable acrylic acid resin and a crosslinking agent onto said monolayer of microspheres to form a slurry, applying said slurry to the surface of said reflective substrate, and curing and crosslinking said coating.

7. A process as claimed in claim 6 wherein said toner and ink receptive coating is an aqueous dispersion consisting essentially of from about 50 to about 70 wt % acrylic acid resin, from about 2 to about 5 wt % of a crosslinking agent, from about 0 to about 2 wt % of a surfactant, and the balance water.

8. A process as claimed in claim 6 wherein said toner and ink receptive coating is a liquid consisting essentially of from about 50 to about 98 wt % of an acrylic acid ester monomer or oligomer having ethylenic unsaturation in its backbone, from about 2 to about 8 wt % of a photocatalyst, and from about 0.5 to about 2 wt % of a surfactant.

9. A process for making a printable retroreflective document comprising the steps of providing a reflective substrate, applying a liquid, transparent toner and ink receptive coating consisting essentially of a crosslinkable acrylic acid resin and a crosslinking agent onto said reflective substrate, applying and embedding a monolayer of microspheres in said coating, and curing and crosslinking said coating.

10. A process as claimed in claim 9 wherein said toner and ink receptive coating is an aqueous dispersion consisting essentially of from about 50 to about 70 wt % acrylic acid resin, from about 2 to about 5 wt % of a crosslinking agent, from about 0 to about 2 wt % of a surfactant, and the balance water.

11. A process as claimed in claim 9 wherein said toner and ink receptive coating is a liquid consisting essentially of from about 50 to about 98 wt % of an acrylic acid ester monomer or oligomer having ethylenic unsaturation in its backbone, from about 2 to about 8 wt % of a photocatalyst, and from about 0.5 to about 2 wt % of a surfactant.

\* \* \* \* \*